(12) United States Patent
Santana

(10) Patent No.: US 8,668,277 B2
(45) Date of Patent: Mar. 11, 2014

(54) EXPANDABLE SHIELD

(76) Inventor: Michael E. Santana, Humble, TX (US)

( * ) Notice: Subject to any disclaimer, the term of this patent is extended or adjusted under 35 U.S.C. 154(b) by 244 days.

(21) Appl. No.: 13/136,628

(22) Filed: Aug. 4, 2011

(65) Prior Publication Data

US 2013/0033093 A1 Feb. 7, 2013

(51) Int. Cl.
*B60B 7/04* (2006.01)

(52) U.S. Cl.
USPC .................................................. 301/37.104

(58) Field of Classification Search
USPC ............ 301/37.103, 37.104, 37, 166, 37.107
See application file for complete search history.

(56) References Cited

U.S. PATENT DOCUMENTS

| | | | |
|---|---|---|---|
| 4,196,692 A | 4/1980 | Vanstrom | |
| 4,792,191 A * | 12/1988 | Farmer | 301/37.102 |
| D438,835 S | 3/2001 | Maschino | |
| 6,412,878 B1 | 7/2002 | Bell et al. | |
| 6,485,106 B1 | 11/2002 | Hermansen et al. | |
| 6,575,537 B1 * | 6/2003 | Wang | 301/37.23 |
| 6,688,703 B1 * | 2/2004 | Wang | 301/37.23 |
| 6,692,085 B1 * | 2/2004 | Threadgill | 301/37.103 |
| 6,905,177 B1 * | 6/2005 | Murillo | 301/37.103 |
| D537,401 S | 2/2007 | Jones | |
| 7,448,694 B1 | 11/2008 | Bentley | |
| 2003/0201666 A1 * | 10/2003 | Artessa et al. | 301/37.103 |
| 2007/0137188 A1 * | 6/2007 | Ohya et al. | 60/311 |

* cited by examiner

*Primary Examiner* — S. Joseph Morano
*Assistant Examiner* — Jean Charleston
(74) *Attorney, Agent, or Firm* — Thomas I. Rozsa

(57) ABSTRACT

An adjustable and expandable shield for a variety of uses and for the rim and the hub of a wheel, to protect them and keep them clean during the detailing process for the tires. Without this shield, the rims and hub which have already been cleaned during the general cleaning of the car become dirty when tire dressing is applied to the tires and would therefore need to be cleaned a second time to remove the tire dressing that sprayed onto the rim and hub. This device covers the rim and hub so that when tire dressing is applied, the rim and hub are shielded from the spray and will not get dirty.

29 Claims, 11 Drawing Sheets

EXPANDABLE SHIELD

BACKGROUND OF THE INVENTION

1. Field of the Invention

This invention relates to a novel aid for shielding a wheel center. More particularly, the present invention relates to expandable wheel shields that protect the centers, including the rim, spokes, hubcap and the like of wheels of varying diameters, from the over application of tire dressing and other chemicals.

2. Description of the Prior Art

The shielding and protection of automobile wheels is generally needed because during the detailing process of a car, the entire car is washed, including the rim and hubcaps, before the dressing is applied to the tires. Any dressing that gets on the rim and the hubcaps is not only a waste of product and but also highly inefficient as those wheels must now be cleaned a second time.

Heretofore, several types of shields and wheel protectors have been devised for just such protection and prevention. These prior art wheels covers generally utilize a circular disc with a radial gap, the sides of which are laid over each other and held in place by tabs, snaps, or other locking mechanisms, thereby giving it a conical shape and decreasing the diameter of the disc to fit the diameter of the tire rim. Another method employed by the prior art is generally that of a folding hand fan, having a plurality of circular-arc sectors overlapping each other and fanning about a central point. Adjusting this type of wheel guard is an involved and tedious process requiring the user to manually adjust each arc sector individually.

The following eight patents are relevant to the field of the present invention.

1. U.S. Pat. No. 4,196,692 issued to Marc. Q. Vanstrom on Apr. 8, 1980 for "Adjustable Paint Guard For Windows" (hereafter the "Vanstrom Patent");

2. U.S. Pat. No. 4,792,191 issued to Frederick M. Farmer on Dec. 20, 1988 for "Automobile Wheel Protector" (hereafter the "Farmer Patent");

3. U.S. Pat. No. D438,835 issued to Kurt A. Maschino on Mar. 13, 2001 for "Protective Wheel Mask For Spraying Vehicle Tires" (hereafter the "Maschino Design Patent");

4. U.S. Pat. No. 6,412,878 issued to Henry O. Bell et al. on Jul. 2, 2002 for "Disposable Wheel Shield" (hereafter the "Bell Patent");

5. U.S. Pat. No. 6,485,106 issued to Brett Lee Hermansen et al. on Nov. 26, 2002 for "Size Adjustable Wheel Rim Masks" (hereafter the "Hermansen Patent");

6. U.S. Pat. No. 6,905,177 issued to Danny Murillo on Jun. 14, 2005 for "Rim Shield" (hereafter the "Murillo Patent");

7. U.S. Pat. No. D537,401 issued to Neil Jones on Feb. 27, 2007 for "Wheel Shield" (hereafter the "Jones Design Patent");

8. U.S. Pat. No. 7,448,694 issued to LaVern Bentley on Nov. 11, 2008 for "Rim and Hubcap Protection" (hereafter the "Bentley Patent").

The Vanstrom Patent discloses an adjustable, rectangular, paint guard for windows, which contains four, identical, overlapping sections, each section having a generally triangular shape with the base of each triangle at the center of the device, and each apex of each triangle oriented at one of the four corners of the rectangle. The device pushes outwardly on each of the four triangle bases thereby expanding the area of the rectangle to cover a rectangular window so that it can be protected during the time when the seal around the outside is painted.

The Farmer Patent discloses a wheel guard of the adjustable cone type, discussed above, having interlocking slits at predetermined locations to cover the diameters of car rims, and further having five holes located near the radial point as a finger hold for the device. Additionally, the device is scored radially every 45° so that the device may be folded for storage.

The Maschino Patent is a design patent that is of the adjustable cone type, discussed above, including three-arced rows having a plurality of slits into one of three corresponding tabs interlocks, thereby adjusting the diameter of the device to fit the interior diameter of the wheel of a car, and also having several holes located near the radial center to provide the user with a finger hold for the device.

The Bell Patent discloses a wheel shield to cover the wheel rim, having a small tab as a handhold and having a plurality of concentric circles perforated close to the outside edge of the device. The Bell device is adjusted by reducing the circumference of the device by removing any of the perforated concentric circles that are larger than the tire rim that is to be protected.

The Hermansen Patent discloses a wheel guard of the adjustable cone type, discussed above, having a plurality of spaced apart snap bottoms and one mating snap top to adjust the diameter of the device, and holes near the conic apex to be used as a finger hold.

The Murillo Patent discloses a wheel guard of the hand fan type, having a plurality of arc sectors appending from a shaft, will all shafts pivoting from a single central point. Adjustment of Murillo device is tedious and time consuming in that it requires the user to manually adjust each shaft individually to create the desired diameter of coverage.

The Jones Patent is a design patent that appears to disclose a wheel shield of one piece that mimics the look and shape of an actual tire, and, because of the curvature of the device and the tabs extending backwardly, the device can sit over the entire wheel, thereby shielding not just the inner rim, but also the tire.

The Bentley Patent discloses a wheel shield of the hand fan type, having a plurality of circular arc sectors that pivot about a central point. A tab on the central point serves as the hand hold. Although it can fold up like a fan, the Bentley device does not teach the possibility of altering the diameter of its device.

Most of the prior art are disc shaped devices that deform into a conical section or are devices that are akin to folding hand fans. The prior art does not provide for a wheel shield that quickly and easily adjusts from one wheel rim diameter to another. The prior art does not provide for a wheel shield that adjusts its diameter of coverage without fussing with tabs, slits, snaps, or manual manipulation of each individual segment. The prior art does not provide for a wheel shield that is made of a plurality of segments that are not arc sectors and yet completely cover the interior diameters of automobile tires. The prior art does not provide for a wheel shield that is made of a plurality of segments capable of the effortless increase or decrease in its diameter of coverage.

SUMMARY OF THE INVENTION

The present invention is an adjustable and expandable shield for the rim and the hub of a wheel, to protect them and keep them clean during the detailing process for the tires. Without this shield, the rims and hub which have already been cleaned during the general cleaning of the car become dirty when tire dressing is applied to the tires and would therefore need to be cleaned a second time to remove the tire dressing that sprayed onto the rim and hub. This device covers the rim and hub so that when tire dressing is applied, the rim and hub are shielded from the spray and will not get dirty.

Another feature of the invention is that it is adjustable or expandable. For example, the inner diameter of tires for cars range from 15" to 24". The prior art is generally of a single diameter, which means that a car detailer would need at least one shield in every size to protect the range of sizes of wheels. The invention is a multi-pieced device that has, for purposes of being used as a tire shield, a minimum diameter of coverage of 15". The invention can be of various proportions depending on the requirements of the user. It can expand to any diameter up to 24" by pulling on the primary plate. Pulling on the primary plate affects the second plate, which has "fans" or "blades". The blades are on the second plate, sandwiched between the second plate and the first plate. Also sandwiched between the two plates is a device that controllably moves all the blades simultaneously either outwardly or inwardly. Pulling/pushing on the handle on the primary plate activates this device, and all the blades are pushed outwardly or pulled inwardly, respectively, around the circumference of the two plates. The blades overlap each other so that there are no gaps and so that the newly expanded area is entirely closed and can thus protect larger wheels as effectively as the smaller 15" wheel. The blades, when extruded outwardly to any degree, form a nearly perfect circle.

Another feature of the present invention is that it can expand and contract using only one hand and a simple flick of the wrist. Depending on the orientation of the blades in relation to the handle, a sharp flick of the wrist counter-clockwise will cause the blades of the present invention to fan outwardly and increase the diameter of coverage. Correspondingly, flicking the device clockwise will cause the blades to retract and thus reduce the area of coverage. The present invention may further be not limited to only opening when flicked in one direction and closed in the other. The blades of the present invention may be made sensitive to any rotational force and reverse their position in response thereto. Additionally, a user may become adept at the application of force such that the user knows how much force to apply to achieve the blades expanding out to a particular distance.

It can further be seen that the present invention has uses beyond that of shielding tire rims. The compact nature of the invention, the ease of use, and the ability for sudden expansion and retraction, makes the present invention ideal for other uses. One alternate use is for use by auxiliary members of a marching band, wherein the present invention can have blades in the school or team colors and as part of the show, a display of the combination of color and the expansion/retraction of the invention will create a very dynamic display. Another use is by cheerleaders, wherein the present invention can have blades in the school's or team's colors, or be colored in such a way that when a plurality of fans are grouped together they form a picture or word. Additionally, a second set of handles may be placed on the other side of the device, and by having different sides of the present invention with different colors for different effects and a handle on either side, it can be seen that one may go from using one side to the other side, quickly and easily, thus the changing effects may be done smoothly and quickly, thereby maximizing the effect of the blades. Another alternate use could be for sporting events, wherein the present invention is passed out to spectators to inspire, rally, cheer, heckle and the like, and further can contain advertising, wording, and various colors and combinations. Other practical uses include the present invention being used as a fan to alleviate the heat, or as an umbrella, which, in the retracted condition, can be carried in a brief case, tote bag or purse and taken out and expanded in the event of rain or need for shielding from the sun. The present invention can also be used as a flying disc for games or sports.

It is therefore an object of the present invention to provide an adjustable and expandable shield for the rim and the hub of a wheel, to protect them and keep them clean during the detailing process for the tires.

It is a further object of the present invention to provide a shield so that the rims and hub which have already been cleaned during the general cleaning of the car will not become dirty when tire dressing is applied to the tires and eliminate to reclean to rims and hub from the tire dressing that sprayed onto the rim and hub. This device covers the rim and hub so that when tire dressing is applied, the rim and hub are shielded from the spray and will not get dirty.

It is an additional object of the present invention to provide a shield which is adjustable or expandable. It is an object of the present invention to provide a shield which comprises a multi-piece device that has, for purposes of being used as a tire shield, a minimum diameter of coverage of 15". The invention can be of various proportions depending on the requirements of the user. It can expand to any diameter up to 24" by pulling on the primary plate. Pulling on the primary plate affects the second plate, which has "fans" or "blades". The blades are on the second plate, sandwiched between the second plate and the first plate. Also sandwiched between the two plates is a device that controllably moves all the blades simultaneously either outwardly or inwardly. Pulling/pushing on the handle on the primary plate activates this device, and all the blades are pushed outwardly or pulled inwardly, respectively, around the circumference of the two plates.

It is also an object of the present invention to have the blades overlap each other so that there are no gaps and so that the newly expanded area is entirely closed and can thus protect larger wheels as effectively as the smaller 15" wheel. The blades, when extruded outwardly to any degree, form a nearly perfect circle.

It is an additional object of the present invention to provide a shield where the blade can expand and contract using only one hand and a simple flick of the wrist. Depending on the orientation of the blades in relation to the handle, a sharp flick of the wrist counter-clockwise will cause the blades of the present invention to fan outwardly and increase the diameter of coverage. Correspondingly, flicking the device clockwise will cause the blades to retract and thus reduce the area of coverage. The present invention may further be not limited to only opening when flicked in one direction and closed in the other. The blades of the present invention may be made sensitive to any rotational force and reverse their position in response thereto. Additionally, a user may become adept at the application of force such that the user knows how much force to apply to achieve the blades expanding out to a particular distance.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
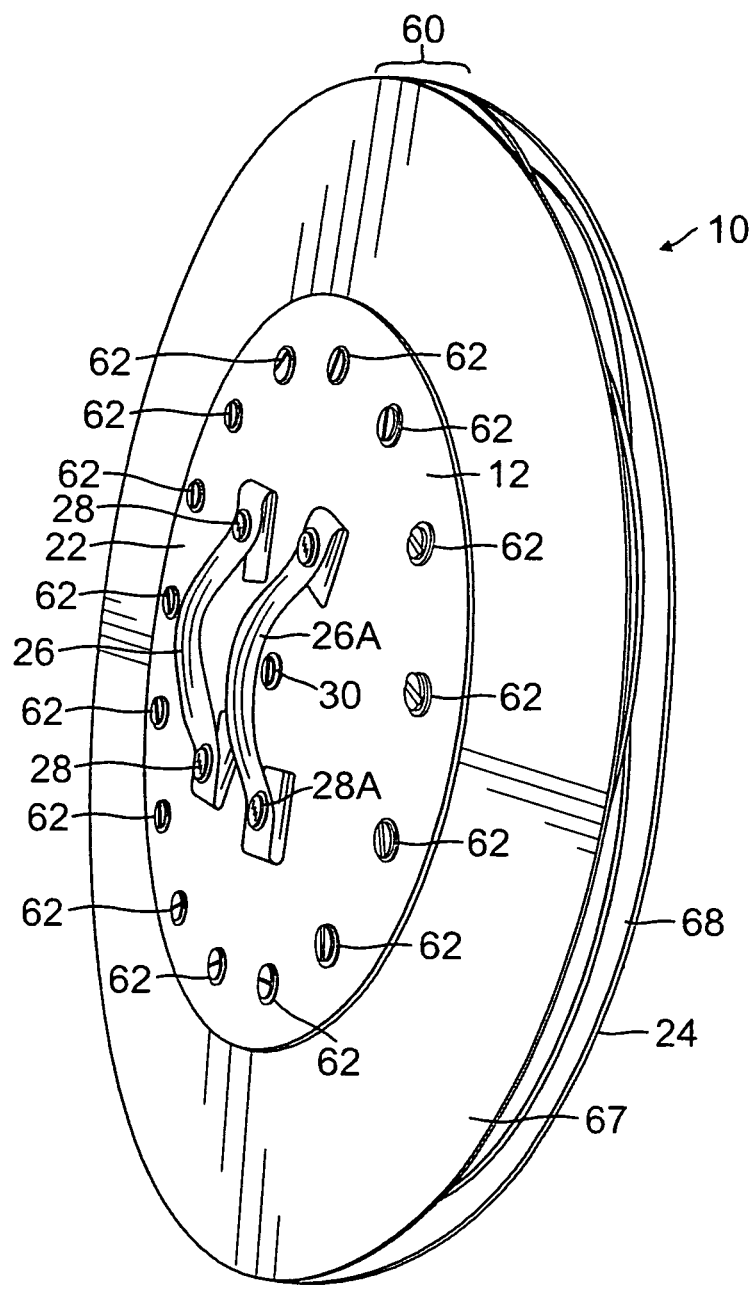
FIG. 1 is a front and side perspective view of a preferred embodiment, illustrating the present invention in a retracted position.
Figure 2:
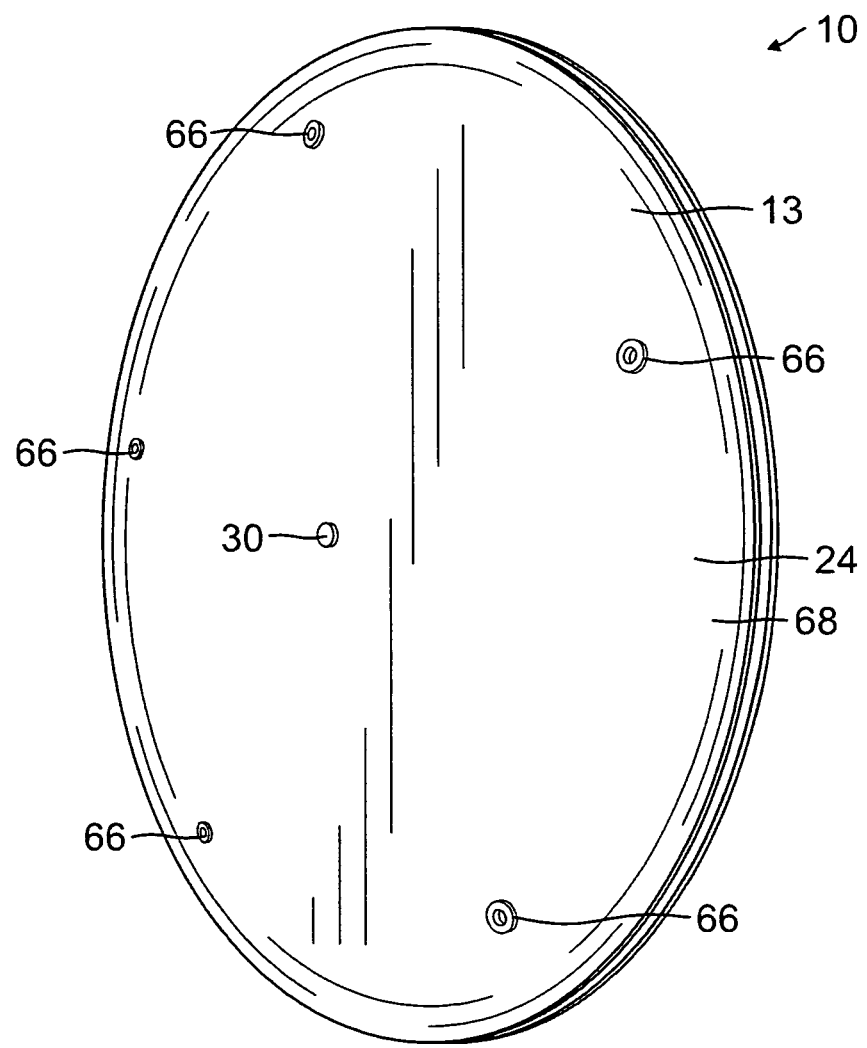
FIG. 2 is a rear and side perspective view of the preferred embodiment, illustrating the present invention in a retracted position.
Figure 3:
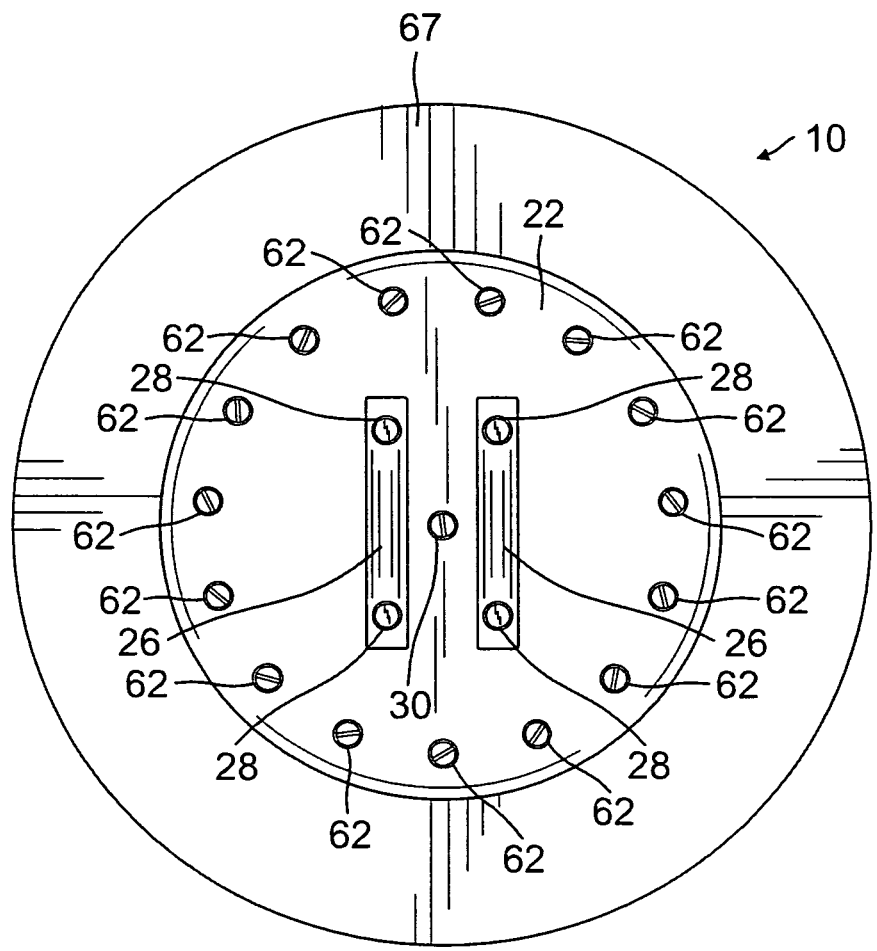
FIG. 3 is a front elevational view of the preferred embodiment, illustrating the present invention in a retracted position.
Figure 4:
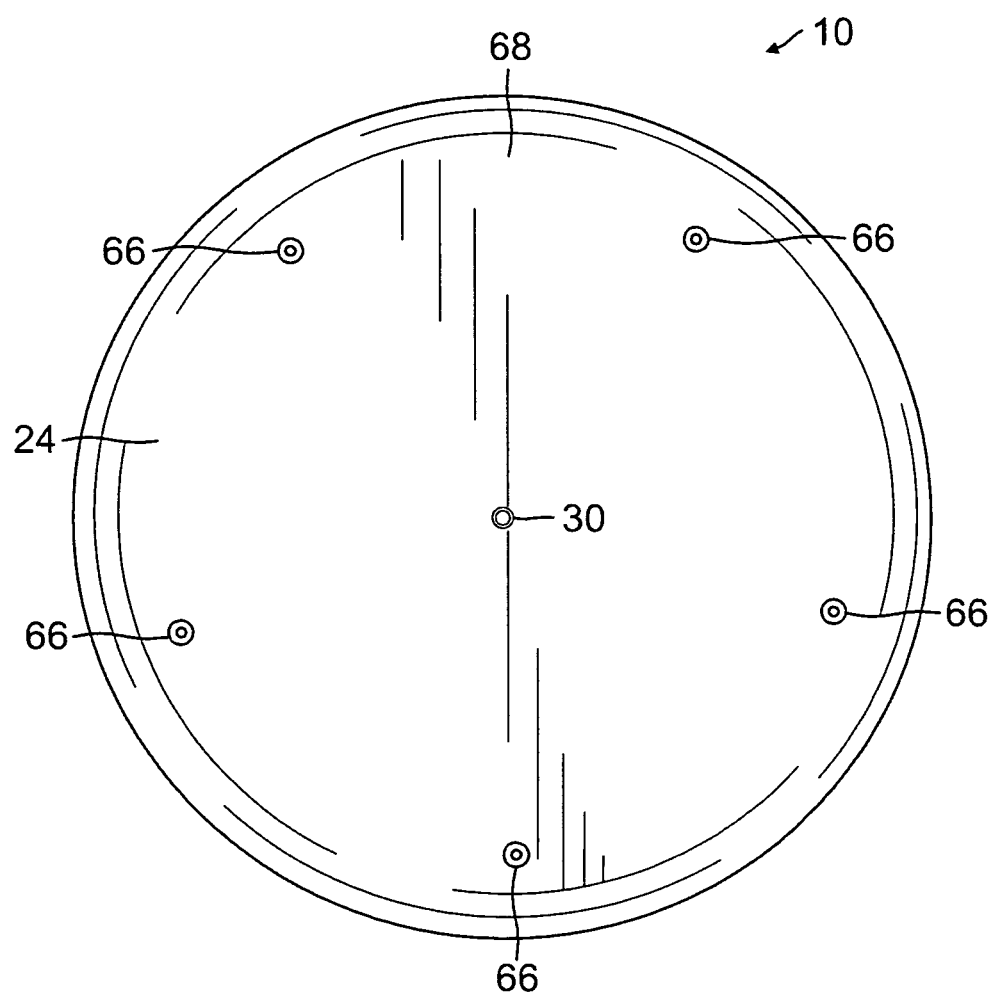
FIG. 4 is a is a rear elevational view of the preferred embodiment, illustrating the present invention in a retracted position.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring now to FIGS. 1, 2, 3 and 4, there is shown the present invention shield 10 in its fully contracted state. On an obverse side 12 of the present invention tire shield 10 is a first exterior surface 22 on which at least one handle and preferably a pair of handles 26 and 26A resides. The handles 26 and 26A are affixed to the first exterior surface 22 by a handle attachments 28 and 28A. On the reverse side 13 of the present invention tire shield 10 is a second exterior surface 24. Sandwiched between the first exterior surface 22 and the second exterior surface 24 is a blade assembly 60. A shaft 30 is located centrally and fastens the first exterior surface 22, the blade assembly 60, and the second exterior surface 24 together. The shaft 30 is also the axis about which the blade assembly 60 rotates.

Also on the first exterior surface 22, there can be seen the upper assembly 63 of a plurality of threaded bolts or pegs 62. However on the reverse side 13, the lower assembly 64 (see FIG. 9B) of the pegs 62 are not seen, and instead there are a plurality of posts 66, the one end of which are seen on second exterior surface 24.

Figure 5:
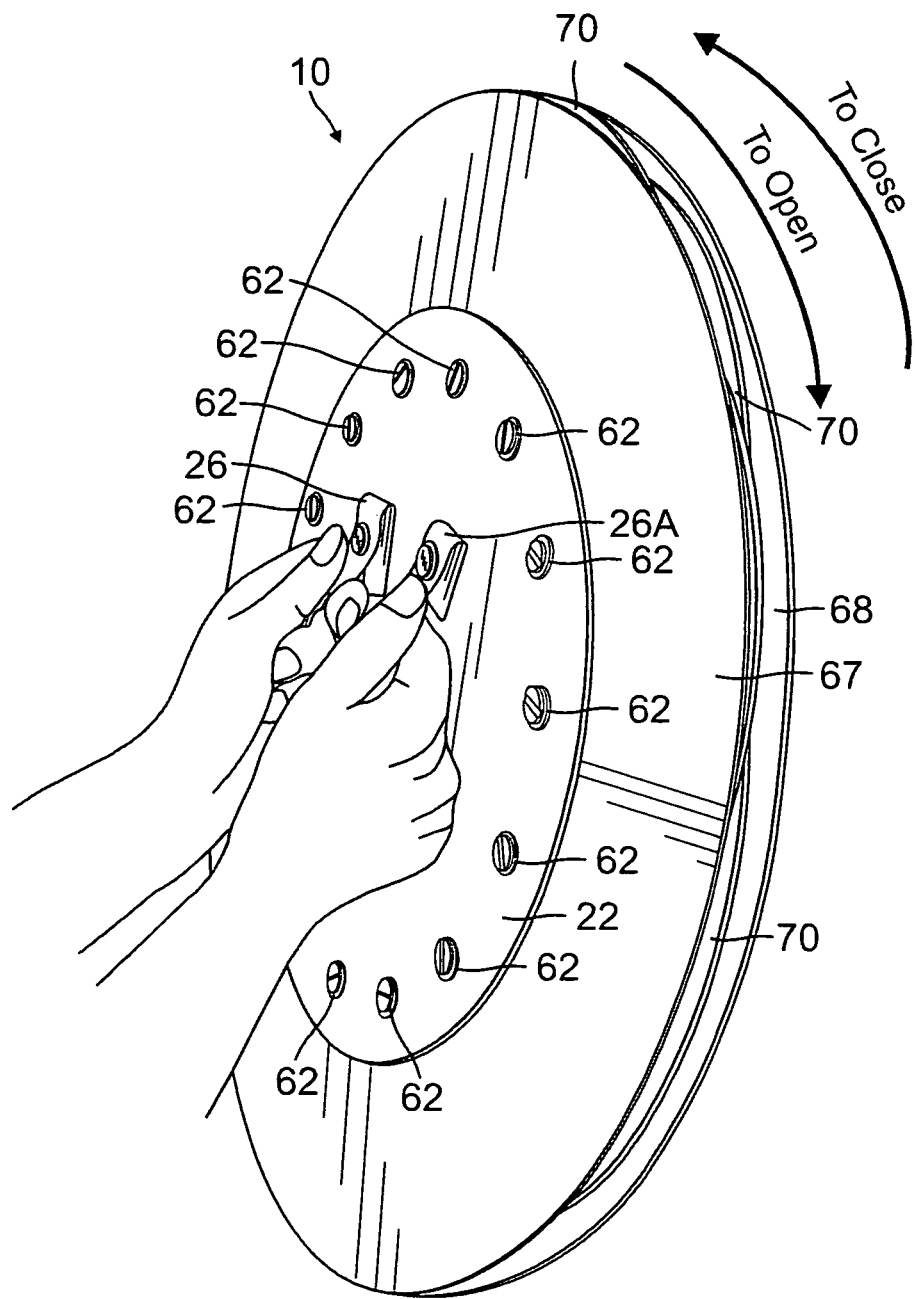
FIG. 5 is an illustration of the preferred embodiment in use by two hands and further illustrating the hands' clockwise movement to expand the blades and the hands' counter-clockwise movement to retract the blades of the present invention
Figure 6:
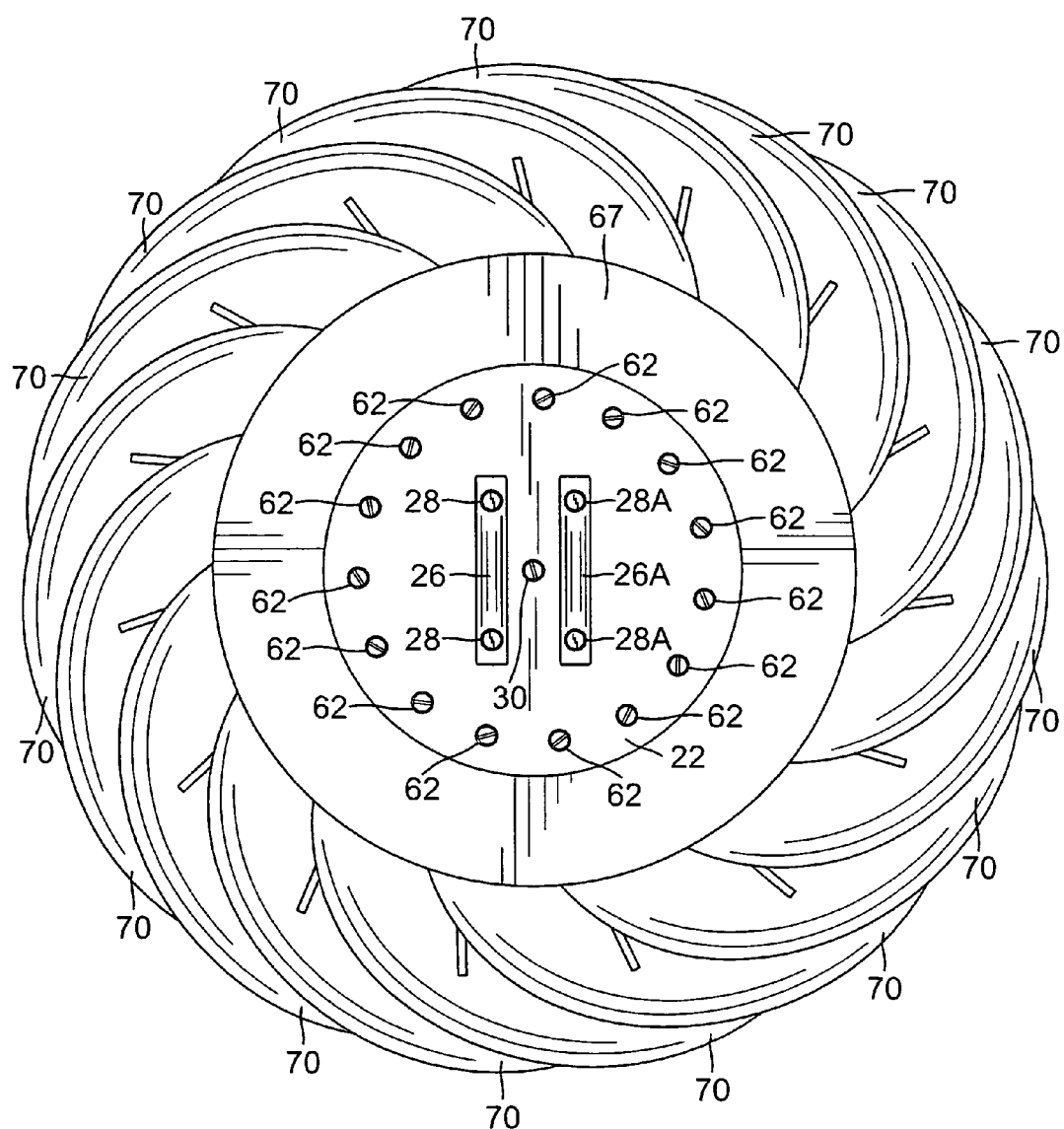
FIG. 6 is a front elevational view of the preferred embodiment, illustrating the present invention in an expanded position.
Figure 7:
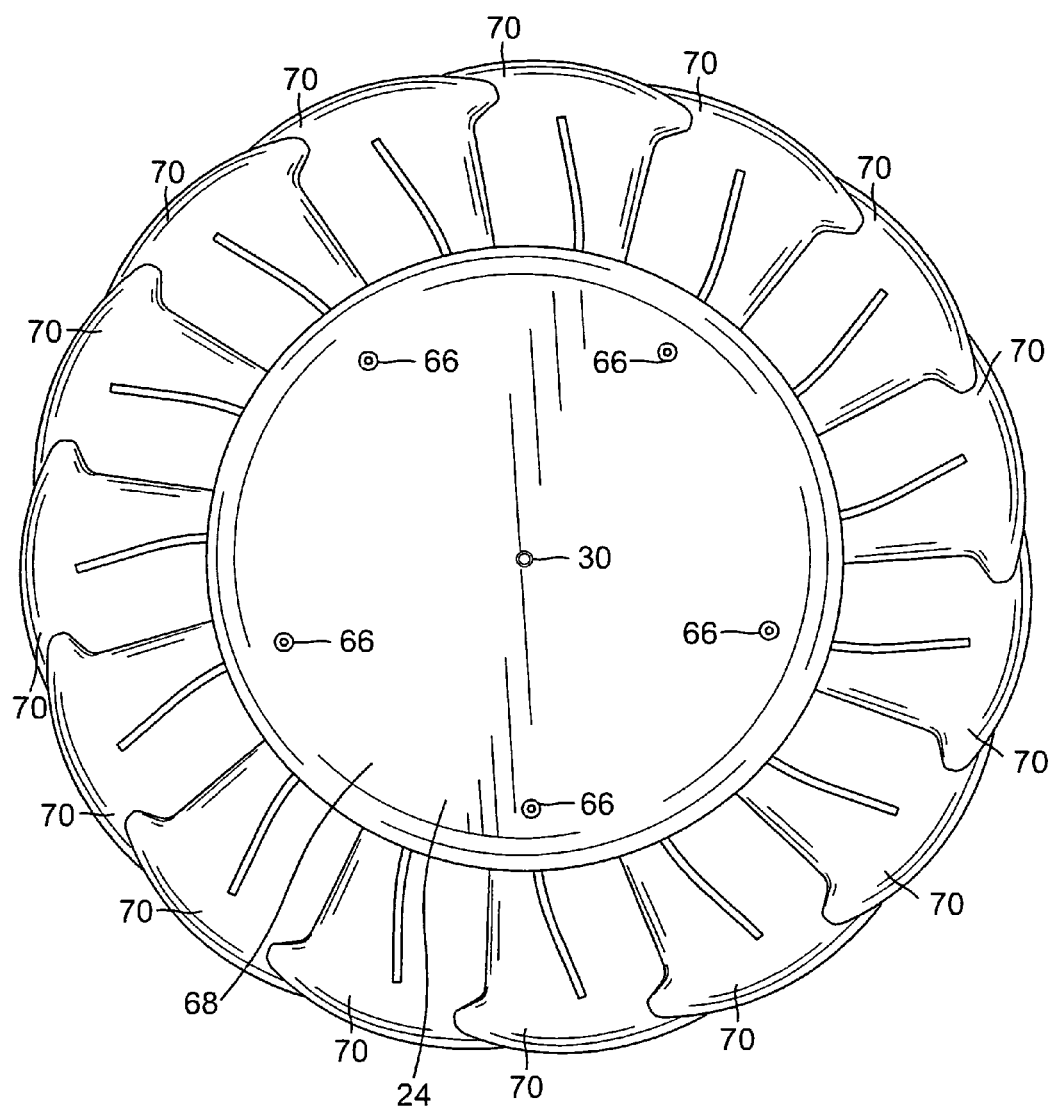
FIG. 7 is a rear elevational view of the preferred embodiment, illustrating the present invention in an expanded position.

The portions of the blade assembly 60 which is readily seen in these views are two panels, first panel 67 and second panel 68. It is preferable that second exterior surface 24 and second panel 68 are the same article, and they are shown in this way in the figures of the present invention, however, they need not be the same article and may be two distinct items. These panels 67 and 68 house and protect the blades 70, provide a platform for blades 70 to extend and retract, and set the minimum diameter of coverage. First panel 67 and second panel 68 are preferably of the same diameter. As shown in FIG. 5, the present invention shield 10 functions by being gripped by the handles 26 and 26A. It should be noted that although FIG. 5 illustrates the present invention being held by two hands, the present invention works also with just a single hand gripping the handle assembly that is provided, whether the handle assembly be a single handle arrangement, a double handle arrangement, a "Y" handle arrangement and the like. The present invention can operate with two hands holding one each of the handles 26 and 26A of the double handle assembly arrangement, as illustrated in FIG. 5, and can operate with only one hand holding both of the handles 26 and 26A. A quick, rotational force on the handles 26 and 26A of the handle assembly in one direction results in the full or partial extension of the blades 70, as illustrated in FIGS. 6 and 7, depending on the amount of force applied to the shield 10. Subsequently, a quick, rotational force in the opposite direction on the handles 26 and 26A results in the retraction of the blades 70. By way of example, FIG. 6 illustrates that a quick, rotational movement on the handles 26 in a clockwise direction results in the blades 70 extending outward and a quick, rotational movement on the handles 26 in a counterclockwise direction (see FIG. 5) results in the blades 70 retracting inwardly between panels 67 and 68. It can be seen in FIG. 7, that because the blades 70 are overlapped, only one of the three slots is exposed, thus only third slot 83 can be seen, as first slot 81 and second slot 82 are covered by the blade 70 that overlaps on top. Additionally third slot 83 is covered by the blade 70 that is below it. Thus, all three slots 81, 82 and 83 are covered by the other blades 70 and provides full coverage and protection from either side of the blades 70.

Figure 8:
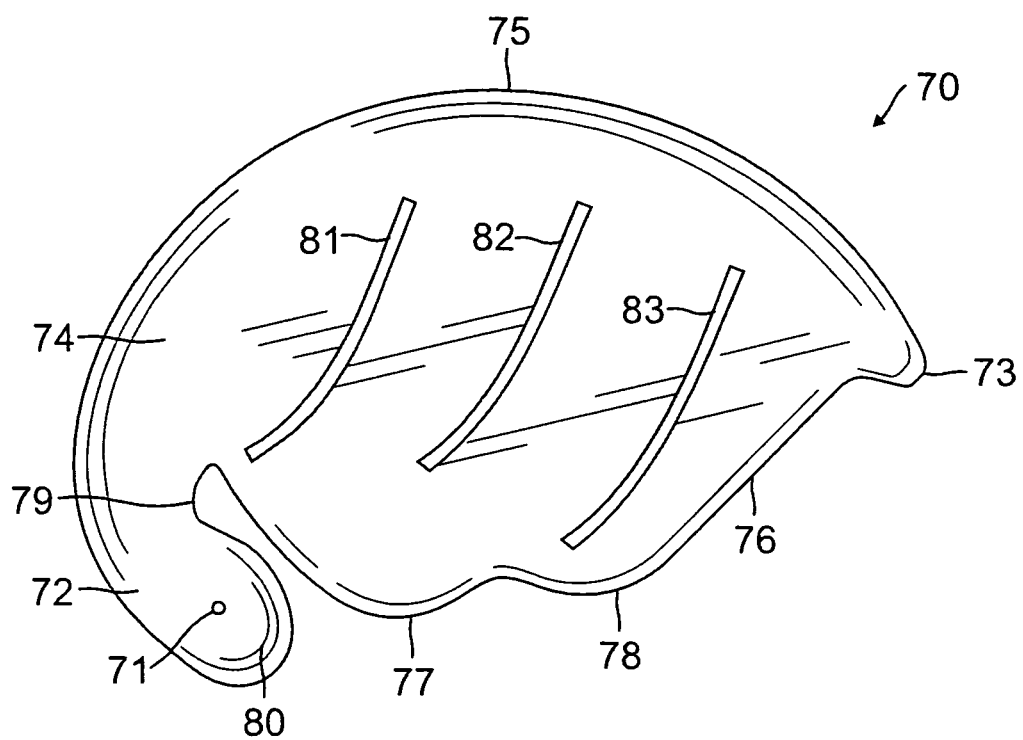
FIG. 8 is a front elevational view of a single blade of the preferred embodiment.

The blades 70 of the present invention shield 10 have a unique shape, as illustrated in FIG. 8, which resembles a "sleeping bird" or a paisely-like silhouette. At one end of the blade 70 is a curved appendage 72 and at the distal end is a nub 73. Between the nub 73 and the curved appendage 72 is broad plane 74, having a blade edge 75 on one side that is preferably of a single smooth arc, and a back edge 76 on the other side that is preferably of two, smoothly connected arcs, first arc 77 and second arc 78. Located transversely on the plane 74 are three slots, a first slot, 81, a second slot 82, and a third slot 83. First slot 81, second slot 82, and third slot 83 have lengths that may be different from each other and trace curvilinear paths that are different from each other. Additionally, although each blade may have all three slots, 81, 82, 83, it will be seen that only one slot 81, 82, or 83 is being used and is dependent on the blade's 70 position in the grouping of all the blades 70. Blades 70 may be created having only one of the required slots, 81, 82 or 83, but this seems inefficient. The curved appendage 72 has a neck 79 ending in a head 80. Each blade 70 also has a pivot hole 71, that is located in the head 80 of the curved appendage 72. Curved appendage 72 is oriented such that it curls back on the back edge 76 side of the blade 70 leaving a space between the neck 79 and head 80 area of the curved appendage 72 and the first arc 77 of the back edge 76 of the blade 70.

Figure 9A:
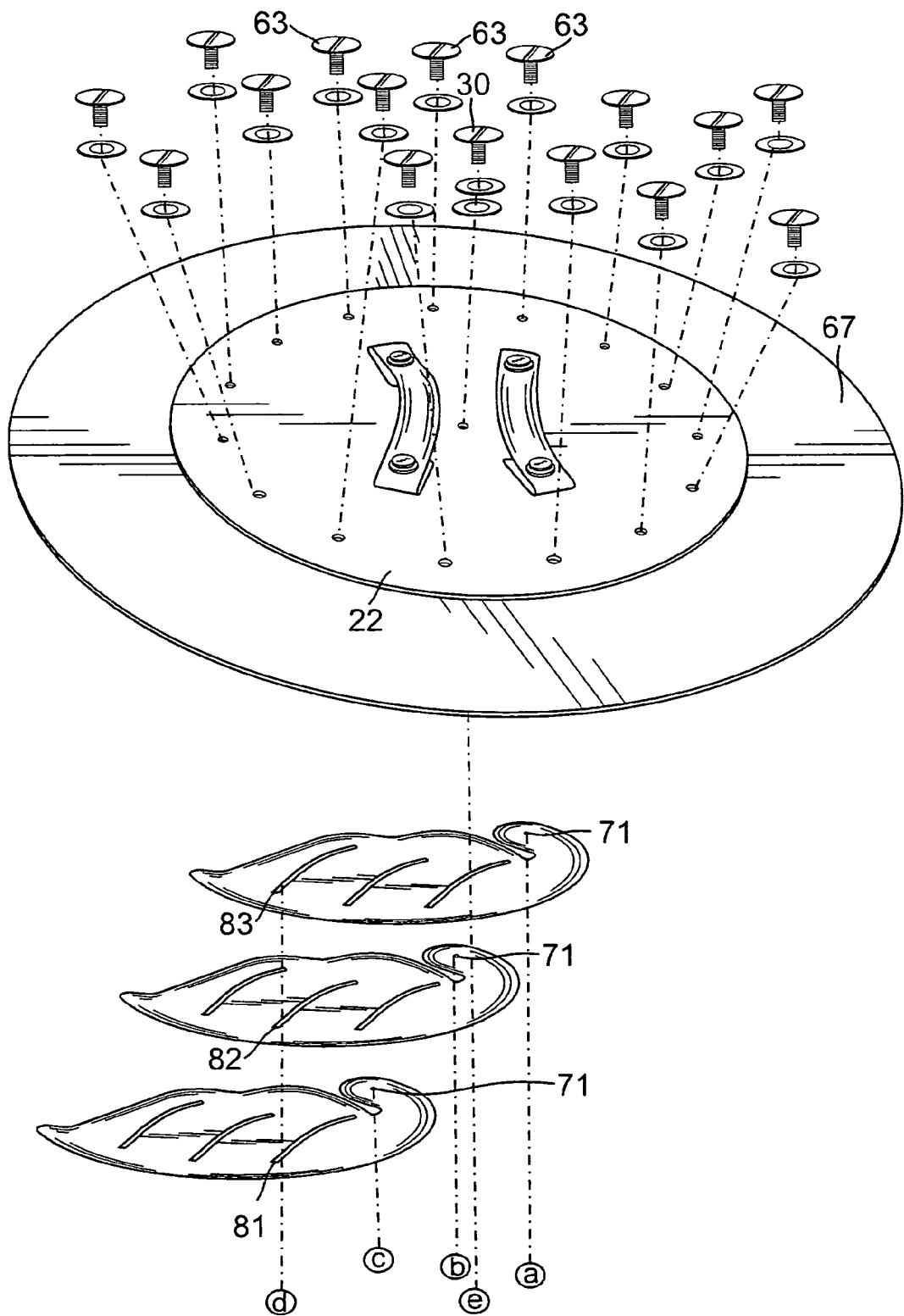
FIG. 9A is an exploded view of the preferred embodiment, illustrating the assembly of the present invention with only an illustrative three blades and is continued in FIG. 9B.
Figure 9B:
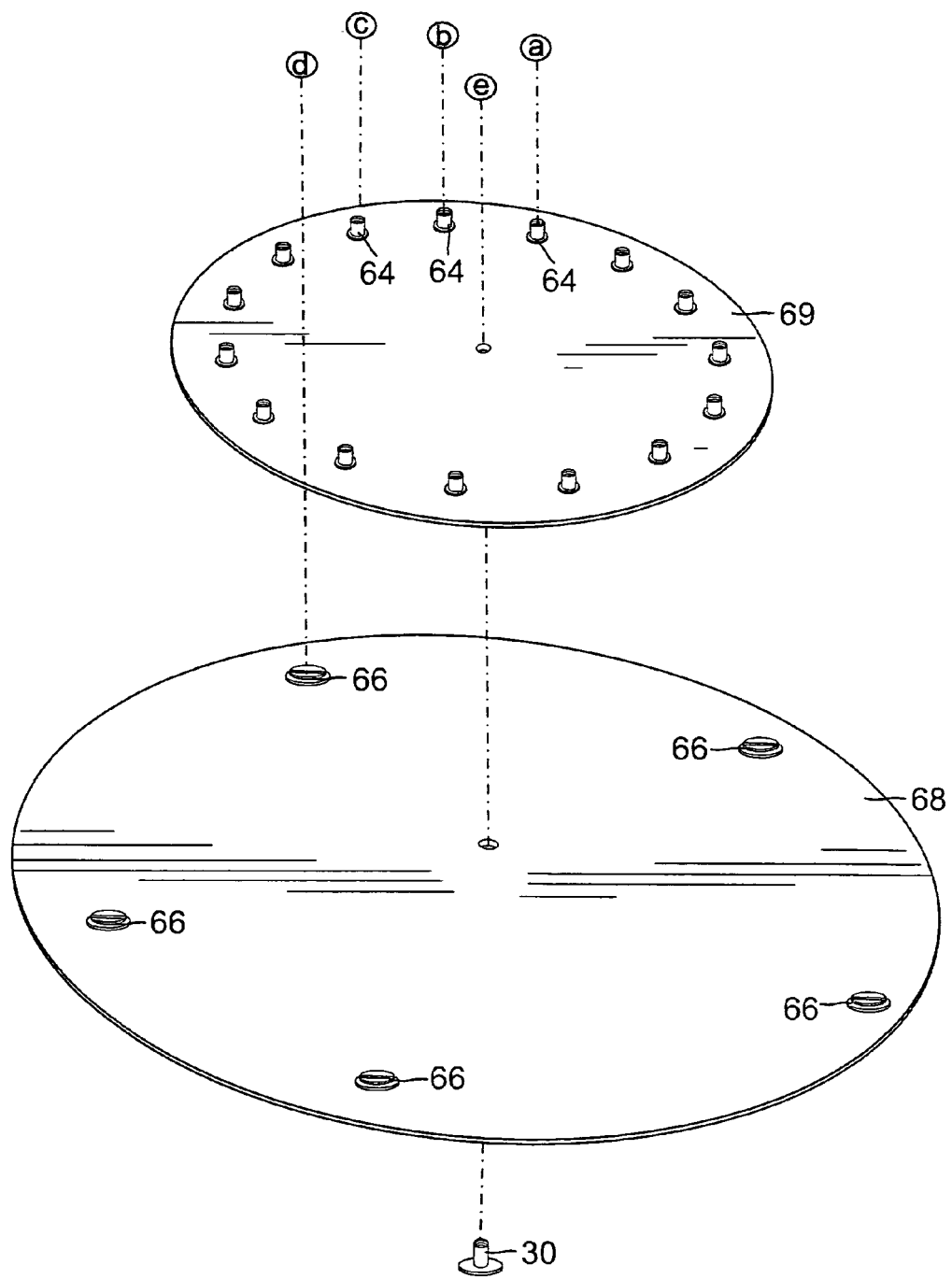
FIG. 9B is a continuation of FIG. 9A which together illustrate an exploded view of the preferred embodiment of the present invention.

Now referring to FIGS. 9A and 9B, there is shown an exploded view of the preferred embodiment of the present invention shield 10 with only three of the preferably fifteen blades to illustrate the functionality and the inter-connectivity of the blades 70.

Each pivot hole 71 of each blade 70 has a corresponding peg 62, and resides on the lower assembly 64 of a threaded bolt or peg 62. The lower assembly 64 of the pegs 62 rises up through a third panel 69. Third panel 69 has a smaller diameter than those of first panel 67 and second panel 68. It can be seen that the pegs 62, pass through and affix first exterior surface 22, first panel 67, pivot hole 71 of blade 70, and third panel 69. The pegs 62 do not affix to second panel 68. The result is that the blades 70 are pivotably affixed in this manner only by their pivot holes 71 to third panel 69, first panel 67 and first exterior surface 22, as shown on FIGS. 9A and 9B by following the tracing lines "a", "b" and "c".

The blade 70 is also affixed to second exterior surface 24 or second panel 68 in the following manner. A group of three blades 70 are arranged so that, although their pivot holes 71 each have their own pegs to which they are pivotably affixed, the three blades 70 share and are slidably affixed to the same post 66. The three blades 70 are sandwiched together so that the blade 70 on the bottom of the three has the post 66 in its first slot 81, the middle blade 70 has the same post 66 in its second slot 82, and the top blade 70 has that same post in its third slot 83, as illustrated by following tracing line "d". Thus, while every blade contains a first slot, 81, a second slot 82 and a third slot 83, only one of these three slots 81, 82, 83 is being used at a time. This helps with reduced costs, because any blade can replace any other blade regardless of its position in the blade assembly 60. Additionally, FIGS. 6 and 7 illustrate that there are fifteen blades in the preferred embodiment, however there can be more blades or fewer blades that would be within the scope and content of this invention. By way of example, in an alternate embodiment, not shown, there are twenty blades, which are grouped in series of four, each group affixed to a respective post assigned to that group.

Figure 10:
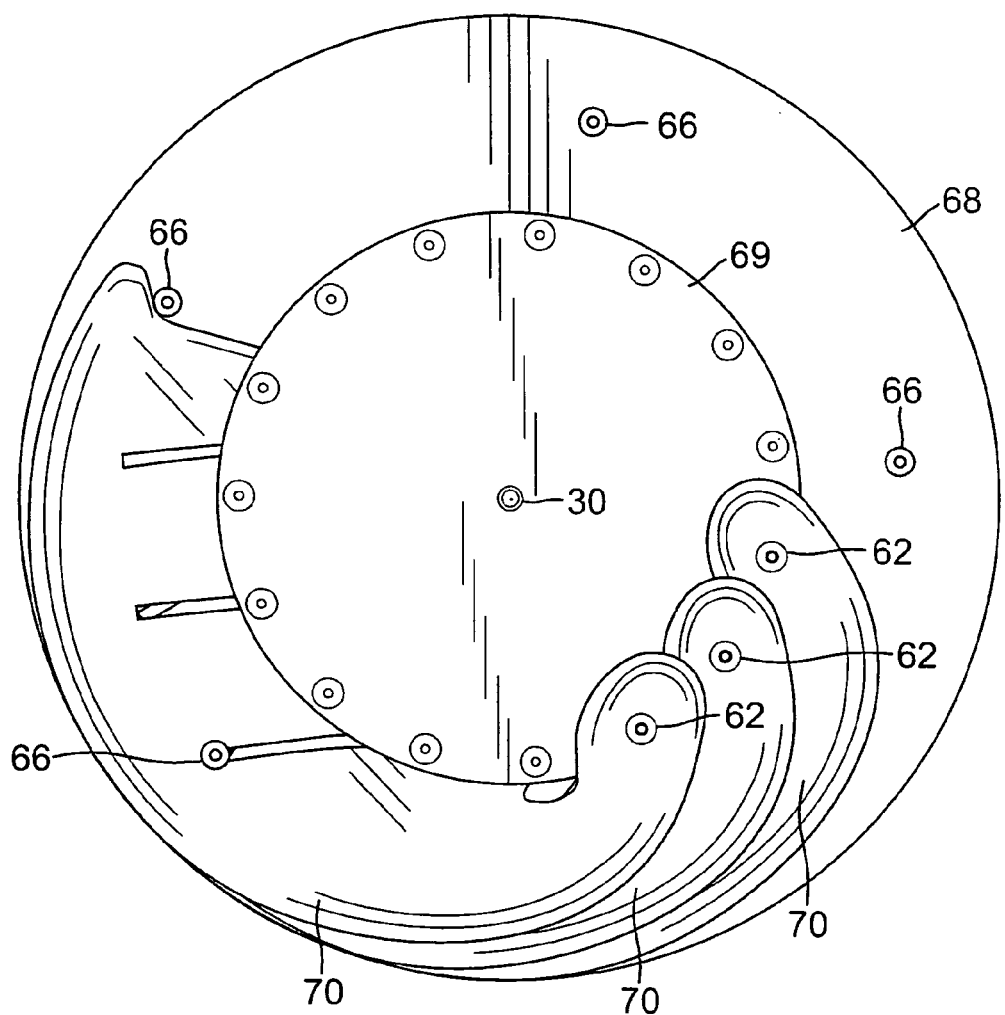
FIG. 10 is an elevational view of part of the present invention detailing the attachment and interconnectivity of an illustrative three blades of the present invention.

Referring now to FIG. 10, although the heads 80 of the curved appendages 72 are affixed to third panel 69 between the second panel 68 and the first panel 67, the remainder of the blade 70 is tucked under the third panel 69. The space between the neck 79 of the curved appendage 72 and the first arc 77 allows the first arc 77 to be tucked under the third panel 69 and most of the rest of the plane 74 of the blade 70 to be thereunder and some portion of the blade edge 75 side not under third panel 69, but still covered by first panel 67 and second panel 68, when in the fully retracted position. Additionally, there may be a cover (not shown) or some other protector that lies between first arc 77 and the bottom assembly of the pegs 62 so that the portion of the bottom assembly 64 of the pegs 62 that lies between third panel 69 and second panel 68 do not catch or impede the movement of the blades 70. The nub 73 of the blade 70 is shaped so that every third blade 70 utilizes a peg 62 as a stop for the fully retracted condition.

The shaft 30 penetrates the center point of the first exterior surface 22, the first panel 67, the third panel 69, the second panel 68, and the second exterior surface 24. Second exterior surface 24 may be the same or a separate article from second panel 68. The shape of the back edge 76 of the blades 70 is shaped to provide the length necessary for each of the three slots 81, 82, 83 on the plane 74 of the blade and yet be able to fit around and not be impeded by the shaft 30. The place where first arc 77 and second arc 78 meet is the part of the back edge 76 of the blade 70 that curves around the shaft 30 when the blades 70 are in the fully retracted condition.

As mentioned above, each of the three slots 81, 82, 83 trace out a different path. This is because each slot 81, 82, and 83, is at a different distance from the pivot hole 71, thus the different paths for each slot is to maximize coverage and to have proper alignment of the blade edge 75 of the shield regardless of how much of the blades 70 have been extended. Additionally, even at full extension, it is preferred that none of the slots 81, 82, 83 are open, but instead are covered by the overlap of the other blades 70, thereby completing the protection of the inner rim and hubcap of a wheel.

The blades 70 are able to expand and retract in the following manner. The heads 80 of the curved appendages 72 are affixed to third panel 69 between the third panel 69 and the first panel 67, the slots 81, 82, 83 are affixed to the second exterior surface 24 or second panel 68. It can be seen that because part of the blade 70, the curved appendage 72, is attached to one surface, first panel 67, and another part of the blade, the plane 74 by one of its slots, 81, 82, or 83, is attached to a different surface, second exterior surface 24, rotating first panel 67 and/or second exterior surface 24, in a direction opposite to the other, will force the blades 70 to move. By way of example, with the shield fully retracted, keeping first panel 67 still and rotating second exterior surface 24 relative to first panel 67, the pegs 62 affixed to first panel 67 are not moving and the posts 66 affixed to second exterior surface 24 are moving. Thus, one part of the blade 67, the curved appendage 72, is staying in place, but another part of the blade 70, the plane 74, is attached to the second exterior surface 24 that is moving. Although the curved appendage 72 is staying in place, it is able to rotate about its respective peg 62 through the pivot hole 71 in the head 80 of the blade 70. Additionally, the blade 70 is attached to second exterior surface 24 by having a post 66 in one of its slots, 81, 82, or 83. Rotating the second exterior surface 24 relative to the first panel 67, means that the post 66 also is moving relative to first panel 67. The blade 70 is able to move with second exterior surface: the head 80 moves about its pivot hole 71 and the post 66 exerts force on the slot 81, 82, 83, in which it resides, causing the blade 70 to move in relation to the post 66. This makes the slot 81, 82, 83 move upwardly in relation to the post 66, causing the blade edge 75 to extend beyond the diameters of first panel 67 and second surface 24. The blade edge 75 will extend outwardly in relation to the amount of rotation of second surface 24 or the amount of torque experienced by the blade 70, to a maximum reached when the post 66 hits the end of the slot 81, 82, 83. The diameter of the protected area is infinitely adjustable up to the maximum length available, as set by the proportion of the blades 70 and the length of the respective slots 81, 82, 83. The length of the slot 81, 82, 83 is preferably set so that the maximum blade edge 75 is exposed yet the blades 70 maintain a circular perimeter when overlapped. For use as a tire shield, it is preferable that the largest diameter of extension is equal to that of the largest tire rim diameter, which at present is 24 inches. The present invention blade meets this by having a distance from pivot hole 71 center to nub 73 of approximately 29 centimeters.

Likewise movement or rotational force in the opposite direction will put force on the slots 81, 82, 83 of the blade 70, resulting in the slot 81, 82, 83 moving downwardly relative to the post 66. This has the effect of the blade 70 retracting and the diameter of coverage decreasing down to the minimum diameter as set by the post 66 being stopped by the other end of the slot 81, 82, 83 or being stopped by the nub 73 of one of the blades 70 within the group of three unable to retract as prevent by a different post 66 or both.

Thus it can be seen that as the user becomes adept at using the present invention shield 10, the user may learn to use the shield 10 with one hand and may learn to know how much torque is required to extract the blades 70 to particular distance. The present invention shield 10 easily can be adapted for cheerleading, parades, and the like. By having the blades 70 of a particular color or set of colors or by having the blades one color on one side and a different color on the other, a team's colors can be flashed for the crowd. Likewise, one side of the shield 10, with blades 70 fully extracted, may have a large letter printed on it. Therefore, a cheerleading squad may flash the team color with one side of the shield 10 and with the other side of the shield 10 spell out the team name or "CHARGE" or the like.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A shield to protect a vehicle rim and hubcap while a tire surrounding the rim and hubcap is being cleaned, comprising:
   a. a first panel having an exterior surface to which is mounted a first exterior handle assembly including a handle panel having at least one attachment member retaining at least one handle;
   b. a second panel opposite to said first panel, the second panel having an exterior surface, a gap between an interior surface of the first panel and an interior surface of the second panel;
   c. a blade assembly located within said gap, and a central shaft extending through the handle panel and fastening together said first panel, said second panel and said blade assembly, the shaft also acting as the axis about which the blade assembly rotates;
   d. a multiplicity of threaded bolts extending through respective threaded openings in the handle panel and first panel;
   e. a multiplicity of covering blades, each covering blade having a curved appendage at its proximal end and a nub at its distal end, a plane with a front single arcuate edge and a rear edge having a double arcuate edge, the front and rear edges located between the nub and curved appendage, three spaced apart slots including a first slot, second slot and third slot located within the plane and extending through the plane from a front side to a rear side, each slot having different lengths and curvatures, the curved appendage having a neck ending in a head with a pivot hole extending through each respective head, the curved appendage oriented so that it curls back on the rear edge side of the blade leaving a space between the head and neck
   f. a respective threaded bolt extending through a threaded opening in the handle panel and extending through the first panel, a pivot hole in a blade and a third interior panel, but does not reach the interior surface of the second panel;
   g. the second panel having a multiplicity of spaced apart retaining posts, each group of three adjacent blades arranged so that a respective pivot hole of the three adjacent blades each have a separate threaded bolt extending through a respective pivot hole to which the blades are pivotally affixed, each group of three blades are sandwiched together so that a blade closest to the rear panel has a joining post extending through a first slot in the blade closest to the rear panel, a middle blade has the same adjoining post extending through a middle or second slot in the middle blade and the blade closest to the first panel has the adjoining post extending through a third slot, the adjoining posts retained in a respective retaining post;
   h. the heads of the curved appendages are affixed to the third panel between the third panel and the first panel, the remainder of each blade is tucked under the third panel, the space between the neck of the curved appendage and the second arcuate edge allows the second arcuate edge to be tucked under the third panel and most of the rest of the plane of the middle blade to be thereunder and some portion of the front arcuate edge not under the third panel, but still covered by the first panel and the second panel, when in the fully retracted position;
   i. the shaft penetrating the center point of the first exterior surface, the first panel, the third panel, the second panel, and the second exterior surface, the shape of the rear edge of the blades is shaped to provide the length necessary for each of the three slots on the plane of each respective blade and yet be able to fit around and not be impeded by the shaft
   j. the place where the first arcuate edge and second arcuate edge of the rear edge meet is the part of the rear edge of the blade that curves around the shaft when the blades are in the fully refracted condition;
   k. each of the three slots in each blade trace out a different path to maximize coverage and alignment of the exterior blade edge of the shield regardless of how much of the blades have been extended; and
   l. a rotation of the at least one handle in one direction will cause the blades to open by the amount of rotation to provide a protective covering shield over the rim and hubcap while the tire is being cleaned and dressed, and rotation of the at least one handle in the opposite direction retracts and eventually conceals all of the blades.

2. The apparatus recited in claim 1, further comprising the blades having at least one of the following characteristics:
   (i) coloring;
   (ii) coloring in conjunction with an exterior surface;
   (iii) lettering;
   (iv) lettering in conjunction with an exterior surface;
   (v) advertising; and
   (vi) advertising in conjunction with an exterior surface.

3. The apparatus recited in claim 1, further comprising a second handle on the second exterior surface.

4. The apparatus recited in claim 1, wherein the diameter of coverage is no more than fifteen inches (15").

5. The apparatus recited in claim 1, wherein the diameter of extended coverage is twenty-four inches (24").

6. A shield to protect a vehicle rim and hubcap while a tire surrounding the rim and hubcap is being cleaned, comprising:
   a. a first panel having an exterior surface to which is mounted a handle and an interior surface;
   b. a second panel spaced apart and opposite to said first panel, the second panel having an exterior surface and an interior surface;
   c. a blade assembly located between said first panel and said second panel, said blade assembly comprising a multiplicity of blades, an interior panel, a multiplicity of posts; and a plurality of retaining pegs, said interior panel having a first side and a second side;
   d. a central shaft extending through the handle panel and fastening together said first panel, said second panel and said blade assembly, the shaft also acting as the axis about which the first panel, the second panel and the blade assembly rotates;
   e. said blades each having a curved appendage at a respective proximal end of a respective blade and a nub at a respective distal, end of a respective blade, a plane with a front single arcuate edge and a rear edge having a first arcuate edge and a second arcuate edge, the front and rear edges located between the nub and curved appendage, at least one spaced apart slot, said slot one of a first slot, a second slot and a third slot located within the plane and extending through the plane from a front side to a rear side, each slot having different lengths and curvatures, the curved appendage having a neck ending in a head with a pivot hole extending through each respective head;

f. said posts, corresponding in number one for each of said blades, and each said post extending through an opening in the first panel and extending through the first panel, the pivot hole in said corresponding blade and the interior panel, wherein said pivot hole is adjacent said first side of said interior panel and said first arcuate edge is adjacent said second side of said interior panel;

g. each said retaining peg extending through said second panel and a group of three adjacent blades, which are overlapped in a bottom blade, a middle blade, and a top blade configuration, and arranged so that each retaining peg extends through the first slot of the bottom blade, the second slot of the middle blade, and the third slot of the top blade;

h. said first arcuate edge and said second arcuate edge of the rear edge of each said blade providing the length necessary for each of the three slots on the plane of each respective blade and allowing the blade to fit around and not be impeded by the shaft; and l. a rotation of the handle in one direction will cause the blades to extend simultaneously their respective front single arcuate edges in relation to the amount of rotation to provide a covering shield over the rim and hubcap, and rotation of the handle in the opposite direction retracts and eventually conceals all of the respective front single arcuate edges of each of the blades.

7. The apparatus recited in claim 6, further comprising the blades having at least one of the following characteristics:
   (i) coloring;
   (ii) coloring in conjunction with an exterior surface;
   (iii) lettering;
   (iv) lettering in conjunction with an exterior surface;
   (v) advertising; and
   (vi) advertising in conjunction with an exterior surface.

8. The apparatus recited in claim 6, further comprising a second handle on the second exterior surface.

9. The apparatus recited in claim 6, wherein the diameter of coverage is no more than fifteen inches (15").

10. The apparatus recited in claim 6, wherein the diameter of extended coverage is twenty-four inches (24").

11. The apparatus recited in claim 6, wherein each of the blades further comprises each of the three slots.

12. The apparatus recited in claim 6, wherein each one of the three slots in each blade trace out a different path to maximize coverage and alignment of the exterior blade edge of the shield regardless of how much of the blades have been extended.

13. The apparatus recited in claim 6, wherein the curved appendage oriented so that it curls back on the rear edge side of the blade leaving a space between the head and neck.

14. A shield having an expanding and contracting diameter, comprising:
   a. an open housing, said open housing having at least first exterior surface and a second exterior surface and an interior;
   b. at least one handle located on the exterior of said open housing;
   c. a blade assembly, said blade assembly comprising at least one blade and, at least one blade extension-retraction mechanism;
   d. a retention mechanism, said retention mechanism retaining said blade assembly in the interior of said open housing and in movable relation to said open housing; and
   e. the blade assembly further including a multiplicity of blades, an interior panel, a multiplicity of posts, and a plurality of retaining pegs, said interior panel having a first side and a second side.

15. The apparatus recited in claim 14, further comprising the blades having at least one of the following characteristics:
   (i) coloring;
   (ii) coloring in conjunction with an exterior surface;
   (iii) lettering;
   (iv) lettering in conjunction with an exterior surface;
   (v) advertising; and
   (vi) advertising in conjunction with an exterior surface.

16. The apparatus recited in claim 14, further comprising a second handle on the exterior of the open housing.

17. The apparatus recited in claim 14, wherein the diameter of coverage is no inure than fifteen inches (15").

18. The apparatus recited in claim 14, wherein the diameter of extended coverage is twenty-four inches (24").

19. The apparatus recited in claim 14, wherein each of the blades further comprises three slots.

20. The apparatus recited in claim 19, wherein each one of the three slots in each blade trace out a different path to maximize coverage and alignment of the exterior blade edge of the shield regardless of how much of the blades have been extended.

21. The apparatus recited in claim 14, wherein a rotation of the handle in one direction will cause the at least one blade to extend outwardly from the open housing to an extent in relation to the amount of rotational force exerted thereon, and rotation of the handle in the opposite direction retracts the at least one blade.

22. The apparatus recited in claim 14, wherein said retention mechanism retains said blade assembly in movable relation to said open housing.

23. The apparatus recited in claim 14, wherein the open housing further comprises a first panel having an exterior surface and an interior surface and a second panel having an exterior surface and an interior surface.

24. The apparatus recited in claim 14, wherein the retention mechanism further comprises a central shaft extending through the open housing and the blade assembly.

25. The apparatus recited in claim 14, further comprising an axis about which at least one of the following elements rotates:
   (i) the open housing rotates;
   (ii) the blade assembly; and
   (iii) the at least one blade.

26. The apparatus recited in claim 14, further comprising a multiplicity of blades, wherein said blades have a distal end and a proximal end.

27. The apparatus recited in claim 14, wherein the extension-retraction mechanism further comprises at least one peg and each of said blades further comprising at least one slot through which the at least one peg resides and which exerts force on the at least one slot to thereby cause the each of said blades to extend or retract in accordance with the force thereby exerted.

28. The apparatus recited in claim 26, wherein each of the multiplicity of said blades each having a curved appendage at a respective proximal end of a blade and a nub at a respective distal end of a respective blade, a broad plane with a front single arcuate edge and a rear edge having a first arcuate edge and a second arcuate edge, the front and rear edges located between the nub and curved appendage, at least one spaced apart slot, said slot one of a first slot, a second slot and a third slot located within the plane and extending through the plane from a front side to a rear side, each slot having different lengths and curvatures, the curved appendage having a neck ending in a head with a pivot hole extending through each respective head, the curved appendage oriented so that it curls back on the rear edge side of the blade leaving a space between the head and neck.

29. The apparatus recited in claim 26, wherein the extension-retraction mechanism further comprises a multiplicity of posts and a multiplicity of pegs, said posts, corresponding in number one for each of said blades, each said blade further comprising a pivot hole and at least one transverse slot, each said post extending through an opening in the first exterior surface and extending through the pivot hole of said blades, and each said retaining peg extending through said second exterior surface of the open housing and slidably affixed to the at least one transverse slot on each of said blades.

\* \* \* \* \*